United States Patent [19]
Adamson et al.

(10) Patent No.: US 6,902,707 B2
(45) Date of Patent: Jun. 7, 2005

(54) APPARATUS AND PROCESS FOR ENHANCED FEED ATOMIZATION

(75) Inventors: William R Adamson, Baton Rouge, LA (US); George A. Swan, III, Baton Rouge, LA (US); Michael W. Bedell, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 89 days.

(21) Appl. No.: 10/113,614

(22) Filed: Apr. 1, 2002

(65) Prior Publication Data

US 2002/0185552 A1 Dec. 12, 2002

Related U.S. Application Data

(60) Provisional application No. 60/285,027, filed on Apr. 19, 2001.

(51) Int. Cl.[7] .............................. C10J 1/08; B05B 1/26; B05B 7/00; B01J 8/08

(52) U.S. Cl. ...................... 422/140; 422/139; 422/224; 422/231; 261/122.1; 261/124; 239/450; 239/543; 239/549; 239/553

(58) Field of Search ................................. 422/231, 230, 422/224, 139, 140; 208/157, 153, 113; 261/122.1, 124, DIG. 39, 75, 76, 78.1; 239/450, 543, 549, 553, 553.3, 553.5, 554, 556, 558, 568, 602, 337, 339

(56) References Cited

U.S. PATENT DOCUMENTS

| 5,173,175 A | 12/1992 | Steffens et al. ............. 208/157 |
| 6,093,310 A | 7/2000 | Swan ......................... 208/113 |
| 6,358,483 B1 | 3/2002 | Trott et al. ................. 422/231 |

*Primary Examiner*—Alexa Doroshenk
(74) *Attorney, Agent, or Firm*—Erika S. Wilson; Gerard J. Hughes

(57) ABSTRACT

A process and apparatus for atomizing a fluid is disclosed herein. The fluid is mixed with an atomizing fluid in a plurality of locations and passed through a nozzle.

15 Claims, 7 Drawing Sheets

APPARATUS AND PROCESS FOR ENHANCED FEED ATOMIZATION

CROSS-REFERENCE TO RELATED APPLICATION

This application claims benefit of U.S. provisional patent application Ser. No. 60/285,027 filed Apr. 19, 2001.

BACKGROUND

Fluidized catalytic cracking (FCC) is an established and widely used process in the petroleum refining industry for converting relatively high boiling products to more valuable lower boiling products including gasoline and middle distillates, such as kerosene, jet fuel and heating oil. The pre-eminent catalytic cracking process is the fluid catalytic cracking process (FCC) wherein a pre-heated feed contacts a hot cracking catalyst. During the cracking reactions, coke and hydrocarbons deposit on the catalyst particles, resulting in a loss of catalytic activity and selectivity. The coked catalyst particles, and associated hydrocarbon material, are stripped, usually with steam, to remove as much of the hydrocarbon material as technically and economically feasible. The stripped particles, containing non-strippable coke, pass from the stripper and to a regenerator. In the regenerator, the coked catalyst particles are regenerated by contacting them with air, or a mixture of air and oxygen, at elevated temperatures, resulting in the combustion of the coke—an exothermic reaction. The coke combustion removes the coke and heats the catalyst to the temperatures appropriate for the endothermic cracking reactions.

The process occurs in an integrated unit comprising the cracking reactor, the stripper, the regenerator, and the appropriate ancillary equipment. The catalyst is continuously circulated from the reactor or reaction zone, to the stripper and then to the regenerator and back to the reactor. The circulation rate is typically adjusted relative to the feed rate of the oil to maintain a heat balanced operation in which the heat produced in the regenerator is sufficient for maintaining the cracking reaction with the circulating, regenerated catalyst being used as the heat transfer medium.

To provide optimal catalytic cracking conditions, one or more nozzles preferably collectively spray the hydrocarbon stream in a pattern that expands to cover substantially the entire cross-sectional area through which the cracking catalyst is flowing. Improved spray coverage provides better catalyst-hydrocarbon feed mixing which enhances catalytic cracking reactions and minimizes thermal cracking reactions. Thermal cracking reactions produce undesirable products such as methane and ethane and decreased yields of more valuable FCC products.

The nozzles preferably produce fine hydrocarbon feed droplets. As droplet size decreases, the ratio of hydrocarbon feed droplet surface area to volume increases, which accelerates heat transfer from the catalyst to the hydrocarbon feed and shortens hydrocarbon feed vaporization time. Quicker vaporization improves yield of catalytic cracking reaction products because the vaporized hydrocarbon feed diffuses into the pores of the catalyst. Conversely, any delay in vaporizing the hydrocarbon feed vaporization and mixing it with the catalyst increases yields of thermal cracking products and coke. Thus, processes and apparatuses that can economically reduce feed droplet size can improve yields in FCC processes.

Single-stage addition of injection or dispersion steam to hot oil for FCC feed injection is well-known in the art. Steam creates a two-phase mixture with oil which promotes formation of liquid ligaments as this oil and steam mixture is ejected through the throat (orifice) of the injection nozzle. These ligaments rapidly break up into smaller diameter droplets. Increasing the kinetic energy of the oil and steam mixture and effectively converting kinetic energy to surface tension energy is believed to improve atomization quality by creation of smaller mean liquid droplet diameters. Methodology for steam addition varies widely. In some instances, steam is simply added via a nozzle or mixing tee connected to the oil feed line upstream of the nozzle. The prior methods seek to obtain a nearly homogeneous mixture of steam and oil upstream of the atomizing nozzle tip. However, the prior methodology does not recognize the ability to achieve even better atomization by combining multiple steam (or other atomization fluid) addition devices as disclosed herein.

SUMMARY

One embodiment of the present invention comprises a process for atomizing an FCC feed in an FCC feed injector comprising a plurality of mixing zones and a feed nozzle. The process comprises (a) contacting the FCC feed with a first atomizing fluid in a first mixing zone; (b) passing the mixture from the first mixing zone to a second mixing zone; (c) in the second mixing zone, contacting the mixture from the first mixing zone with a second atomizing fluid selected from the group consisting of steam, light hydrocarbon gases, and combinations thereof; and, (d) passing the resulting mixture from the second mixing zone through a feed nozzle.

Another embodiment of the present invention comprises an atomizing process comprising (a) injecting a first atomizing fluid into a feed; (b) subsequently injecting a second atomizing fluid into the feed/atomizing fluid mixture from step (a), the second atomizing fluid selected from the group of steam, light hydrocarbon gases, and combinations thereof; and (c) passing the mixture from step (b) through a nozzle.

Another embodiment of the present invention comprises an atomizing process comprising: (a) sparging a first atomizing fluid into a feed; (b) simultaneously sparging a second atomizing fluid into the feed, the second atomizing fluid selected from the group consisting of steam, light hydrocarbon gases and combinations thereof; and (c) passing the mixture from step (b) through a nozzle.

Another embodiment of the present invention comprises a fluidized catalytic cracking process comprising: (a) passing an FCC feed to a feed injector comprising a plurality of mixing zones and a nozzle; (b) in a first mixing zone, injecting a first atomizing fluid into the FCC feed; (c) in a second mixing zone positioned downstream from the first mixing zone, injecting a second atomizing fluid into the FCC feed/atomizing fluid mixture from the first mixing zone, the second atomizing fluid selected from the group consisting of steam, light hydrocarbon gases, and combinations thereof; (d) passing the FCC feed/atomizing fluid mixture from the second mixing zone through the nozzle, the nozzle having an outlet positioned to produce a spray of FCC feed droplets into a reaction zone; and, (e) contacting the FCC feed droplets with a FCC catalyst in the reaction zone to produce a product stream and spent catalyst comprising strippable hydrocarbons.

Another embodiment of the present invention comprises a FCC feed injector comprising: (a) a feed inlet; (b) a first atomizing fluid inlet; (c) a second atomizing fluid inlet; (d) an external sparger in fluid communication with the feed inlet and the first atomizing fluid inlet, the external sparger configured to define a first mixing zone; (e) a second mixing zone in fluid communication with the second atomizing fluid inlet and the first mixing zone, the second mixing zone configured to receive the FCC feed/atomizing fluid mixture from the first mixing zone and promote mixing between the mixture from the first mixing zone and a second atomizing fluid; and, (f) a feed nozzle in fluid communication with the second mixing zone, the nozzle configured to pass the FCC feed/atomizing fluid into the riser reaction zone in a predetermined spray pattern.

Another embodiment of the present invention comprises a FCC feed injector comprising: (a) a feed inlet; (b) a first atomizing fluid inlet; (c) a second atomizing fluid inlet; (d) a mixing tee in fluid communication with the feed inlet and the first atomizing fluid inlet, the mixing tee configured to define a first mixing zone; (e) a second mixing zone in fluid communication with the second atomizing fluid inlet and the first mixing zone, the second mixing zone configured to receive the FCC feed/atomizing fluid mixture from the first mixing zone and promote mixing between the mixture from the first mixing zone and a second atomizing fluid; and, (f) a feed nozzle in fluid communication with the second mixing zone, the nozzle configured to pass the FCC feed/atomizing fluid into the riser reaction zone in a predetermined spray pattern.

Another embodiment of the present invention comprises a FCC feed injector comprising: (a) a feed inlet; (b) a first atomizing fluid inlet; (c) a second atomizing fluid inlet; (d) a first mixing zone in fluid communication with the feed inlet and the first atomizing fluid inlet, the first mixing zone configured to receive the FCC feed and first atomizing fluid and promote mixing between the FCC feed and first atomizing fluid; (e) an external sparger in fluid communication with the second atomizing fluid inlet and the first mixing zone, the external sparger configured to define a second mixing zone, the second mixing zone configured to receive the FCC feed/atomizing fluid mixture from the first mixing zone and promote mixing between the mixture from the first mixing zone and a second atomizing fluid; and, (f) a feed nozzle in fluid communication with the second mixing zone, the nozzle configured to pass the FCC feed/atomizing fluid into the riser reaction zone in a predetermined spray pattern.

Another embodiment of the present invention comprises a FCC feed injector comprising: (a) a feed inlet; (b) a first atomizing fluid inlet; (c) a second atomizing fluid inlet; (d) a first mixing zone in fluid communication with the feed inlet and the first atomizing fluid inlet, the first mixing zone configured to receive the FCC feed and first atomizing fluid and promote mixing between the FCC feed and first atomizing fluid; (e) a mixing tee in fluid communication with the second atomizing fluid inlet and the first mixing zone, the mixing tee configured to define a second mixing zone, the second mixing zone configured to receive the FCC feed/atomizing fluid mixture from the first mixing zone and promote mixing between the mixture from the first mixing zone and a second atomizing fluid; and, (f) a feed nozzle in fluid communication with the second mixing zone, the nozzle configured to pass the FCC feed/atomizing fluid into the riser reaction zone in a predetermined spray pattern.

DETAILED DESCRIPTION

The process embodiments disclosed herein comprise multiple stage injection of atomizing fluid into an incoming feed material, which decreases feed droplet size. After multiple injections of atomizing fluid, the feed/atomizing fluid mixture passes through a nozzle that can be configured to create a predetermined spray pattern of feed droplets. The apparatus embodiments disclosed herein generally comprise a feed injector adaptable for use with new or existing feed injector nozzles. The feed injector comprises a plurality of mixing zones, preferably two mixing zones. The mixing zones may completely or at least partially overlap, or one zone may be completely downstream from one another so that there is no overlap between mixing zones. The embodiments disclosed herein create a more homogeneous fluid entering the injector nozzle, thereby creating a more desirable droplet size distribution. The embodiments disclosed herein are useful in a variety of processes, including FCC, but are not limited to use with FCC processes.

Each mixing zone is configured to mix a stream of atomizing fluid and feed material, preferably in a liquid state. Each mixing zone is preferably configured to inject the atomizing gas into the feed. Though not preferred, the flow paths of the feed and the atomizing fluid could be switched (i.e., the process/apparatus could be configured so that the feed is sparged into the atomizing gas).

The atomizing fluid may comprise subcooled water (water having a temperature above its normal atmospheric pressure boiling point at pressure sufficient to maintain it in a liquid state), steam, light hydrocarbon gas ($C_4$—), inert gases and/or combinations thereof. Light hydrocarbon gases include, but are not limited to methane, ethane, ethylene, acetylene, propane, propylene, propyne, butane and butenes and combinations thereof. Inert gases as used herein include, but are not limited to, helium, hydrogen, nitrogen, argon, and other suitable inert gases and combinations thereof. The same or a different atomizing fluid may be injected into each mixing zone. Alternatively, the atomizing fluid may be derived from a common source and split into predetermined amounts passing to each mixing zone. Each mixing zone may be configured in a variety of ways, including, but not limited to mixing tees 320, internal spargers 300, external spargers 310 and other conventional means known in the art.

In embodiments employing spargers (internal and/or external), the sparger orifices are sized such that at typical operating conditions, atomizing fluid is injected into liquid feed at high velocities, preferably greater than about 250 ft/sec (about 76 m/sec), more preferably greater than about 500 ft/sec (152 m/sec).

Figure 1:
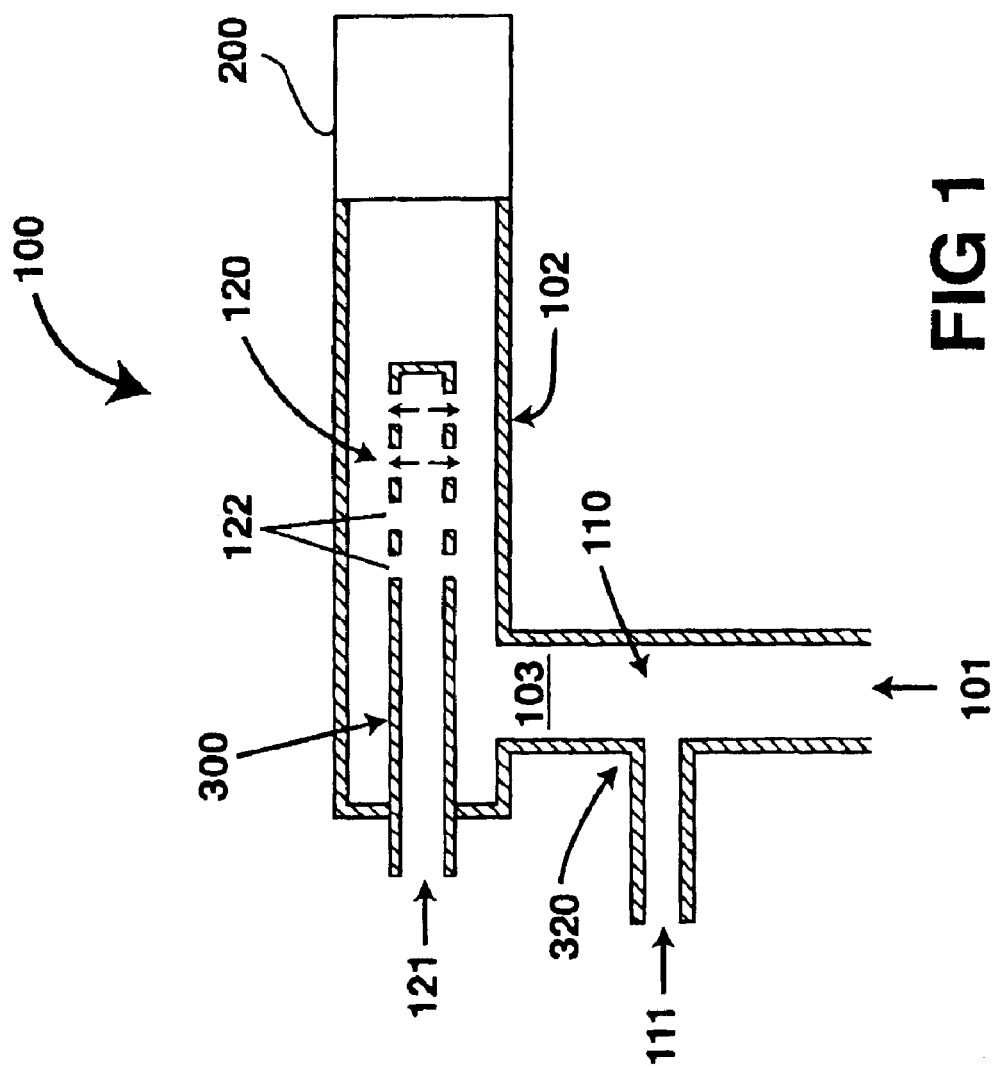
FIG. 1 illustrates an embodiment comprising a mixing tee and an internal sparger.

One embodiment of the present invention is shown in FIG. 1. The feed injector 100 has an outlet connecting it to a nozzle 200, shown as a box indicating that any conventional nozzle may be used with the injector 100. Injector 100 generally comprises a conduit 102 defining a fluid passageway 103 and configured to define at least two mixing zones. Two mixing zones 110, 120 are shown in each FIGS. 1–7.

The embodiment shown in FIG. 1 has a mixing tee 320 that mixes incoming feed from feed inlet 101 with atomizing fluid passing through inlet 5 in the first mixing zone 110. The feed/atomizing fluid mixture passes from first mixing zone 110 into second mixing zone 120. An internal sparger 300 mixes the feed/atomizing fluid mixture with additional atomizing fluid. This additional atomizing fluid passes from inlet 121 through outlet(s) 122 (orifices) and into passageway 103 where it mixes with the passing feed/atomizing fluid mixture. The resulting mixture passes from the injector 100 and into and through nozzle 200 resulting in a spray of liquid feed droplets.

Figure 2:
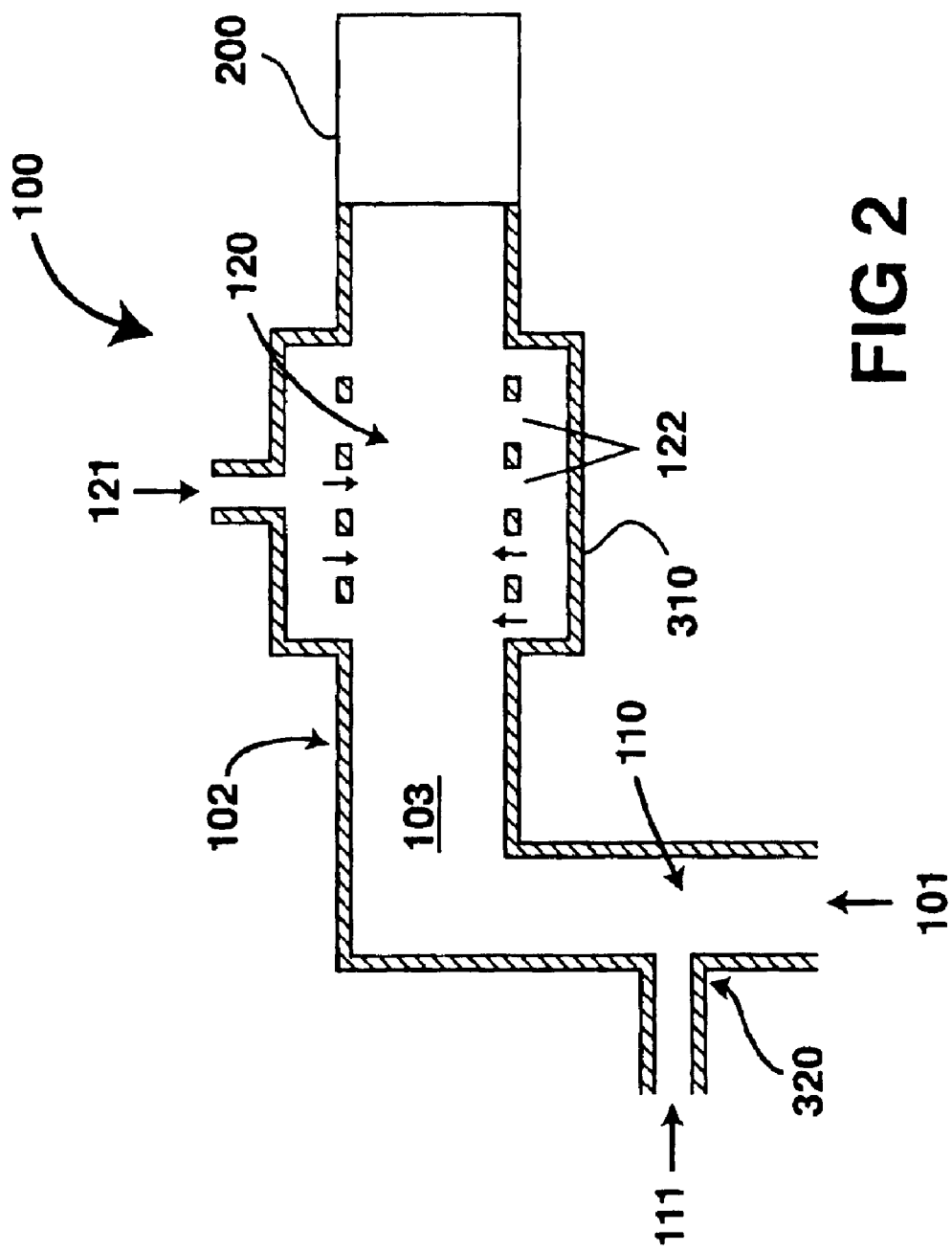
FIG. 2 illustrates an embodiment comprising a mixing tee and an external sparger.

The embodiment shown in FIG. 2 is similar to that shown in FIG. 1, except that an external sparger 310 is used in the second mixing zone 120 to inject additional atomizing fluid with the feed/atomizing fluid mixture passing from the first mixing zone 110.

Figure 3:
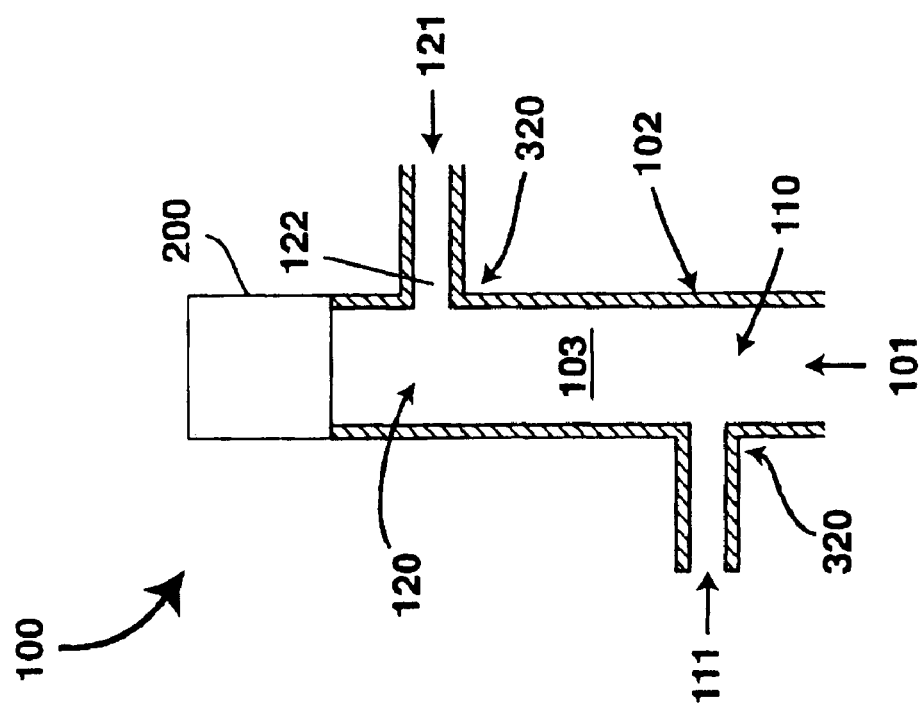
FIG. 3 illustrates an embodiment comprising a pair of mixing tees.

The embodiment shown in FIG. 3 is similar to that shown in FIG. 1, except that a mixing tee 320 is used in the second mixing zone 120 to inject additional atomizing fluid with the feed/atomizing fluid mixture passing from the first mixing zone 110.

Figure 4:
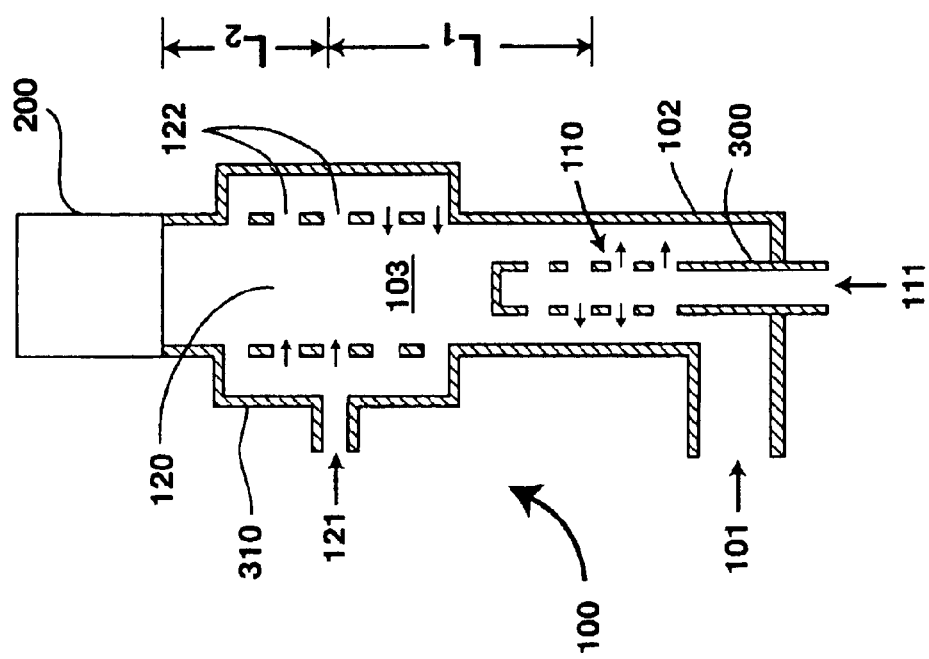
FIG. 4 illustrates an embodiment comprising an internal sparger upstream from an external sparger.

The embodiment shown in FIG. 4 illustrates an embodiment wherein an internal sparger 300 injects atomizing gas into the first mixing zone 110 and an external sparger 310 injects atomizing gas into the second mixing zone 120. Though not shown, the external sparger 310 could be used to inject atomizing gas into the first zone 110 in conjunction with an internal sparger 310 in the second mixing zone 120.

Figure 5:
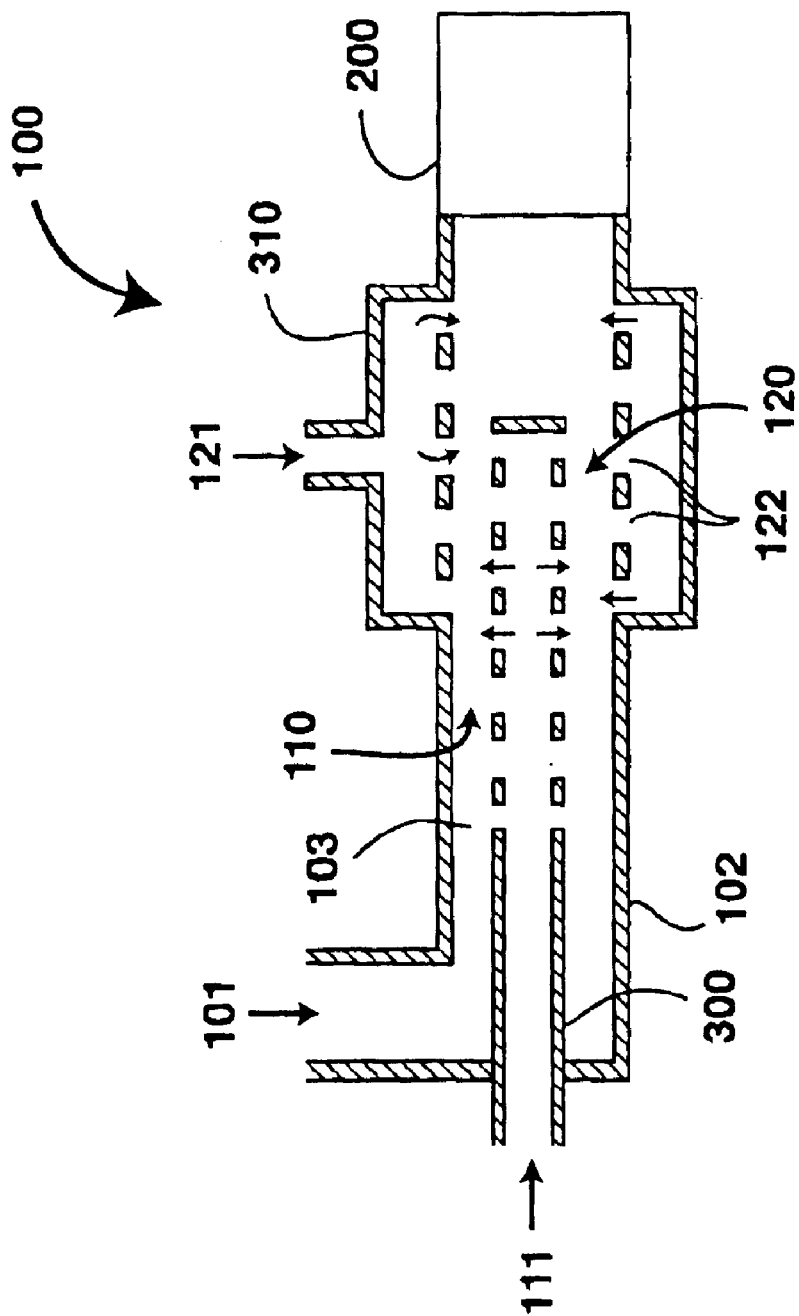
FIG. 5 illustrates an embodiment wherein the mixing zones are configured to at least partially overlap.

The embodiment shown in FIG. 5 is similar to that shown in FIG. 4 except that the internal sparger 300 and external sparger 310 provide overlap between the first and second mixing zones 110, 120. The first and second mixing zones 110, 120 may partially overlap, completely overlap, or not overlap at all. As used in the claims, simultaneous sparging means that the mixing zone spargers at least partially overlap.

Figure 6:
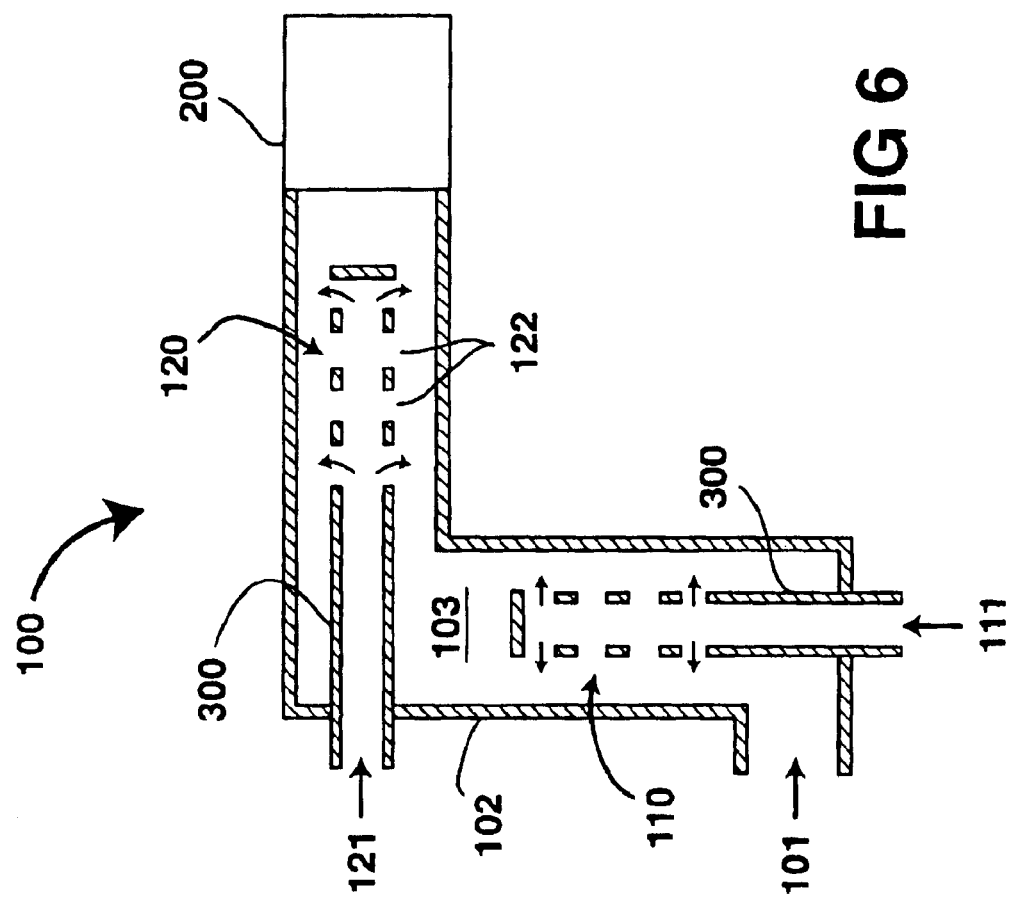
FIG. 6 illustrates an embodiment comprising a pair of internal spargers.
Figure 7:
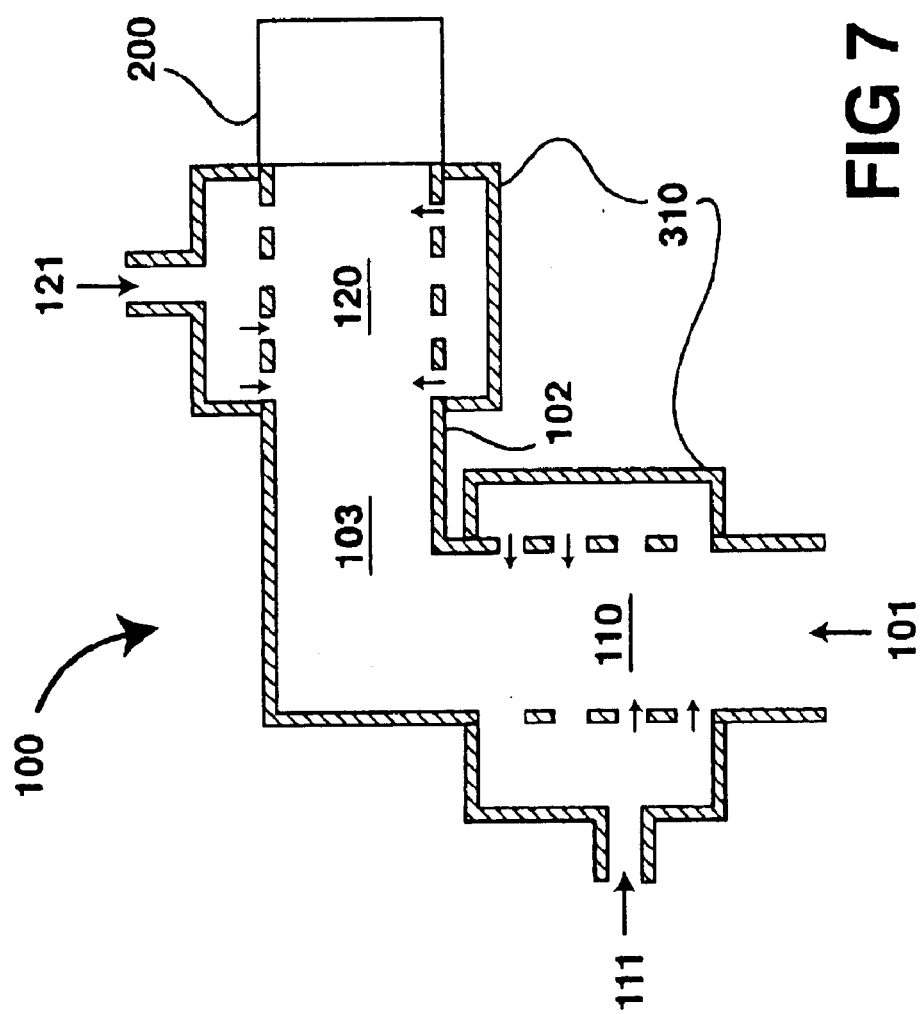
FIG. 7 illustrates an embodiment comprising a pair of external spargers.

The embodiment shown in FIG. 6 illustrates an embodiment wherein internal spargers 300 inject atomizing gas into the first and second mixing zones 110, 120. The embodiment shown in FIG. 7 illustrates an embodiment wherein external spargers 310 inject atomizing gas into the first and second mixing zones 110, 120.

Viewing FIG. 4, downstream mixing zones (i.e., mixing zone 120 in FIGS. 1–7 or any subsequent mixing zones, if desired) are preferably positioned downstream from preceding mixing zones at a distance $L_1$ equal to or less than about 50 internal pipe diameters, more preferably less than about 15 internal pipe diameters, and even more preferably between about 3 and about 5 internal pipe diameters. The distance component of $L_1$ is preferably measured along the axial centerline of passageway 103 and is measured between the approximate midpoints of any two mixing zones. The distance between the final mixing zone (i.e., mixing zone 120 in a two-zone injector) and the nozzle 200 outlet orifice (not shown) designated as $L_2$ in FIG. 4, is preferably less than about 15 internal pipe diameters, more preferably between about 3 and about 10 internal pipe diameters. The length component of $L_2$ is measured along the axial centerline of passageway 103 between the approximate midpoint of the final mixing zone and the outlet orifice of nozzle 200.

One could use mixing tees 320 in place of the spargers, and vice versa. Conduit 102 can be any suitable shape or cross-section such as L-shaped (FIGS. 1–2, 6–7) or substantially linear (FIGS. 3–5). Though not shown in the Figures, the atomizing fluid passing into each mixing zone may derive from the same source.

Viewing FIG. 1 for example, in operation, liquid feed passes into the injector 100 through feed inlet 101 and into fluid passageway 103. Steam, or other suitable atomizing fluid, is injected (passes) into passageway 103 via inlet 111, where the steam is injected, or mixed, with the flowing feed in first mixing zone 110 to form a two-phase fluid. The steam/feed mixture flows downstream in fluid passageway 103 to second mixing zone 120 where it mixes with a second atomizing fluid (e.g., steam) injected into passageway 103. The combined mixture from the second mixing zone 120 passes through the outlet end of injector 100 and into a nozzle 200. The nozzle then sprays the feed (in droplet form) in desired spray pattern.

The addition of atomizing fluid to the liquid feed creates a two-phase mixture that promotes formation of liquid ligaments as the feed and atomizing fluid pass through fluid passageway 103. It is believed that as more atomizing fluid is injected at high velocity into the mixture in subsequent mixing zone, the kinetic energy of the mixture increases and its homogeneity increases, causing liquid ligaments to form as the liquid feed/atomizing fluid is ejected through the throat (orifice) of the injection nozzle 200. These ligaments rapidly break up into smaller diameter droplets. It is believed that increasing the kinetic energy of the feed/atomizing fluid mixture and the effective conversion of kinetic energy to surface tension energy improves atomization quality by creation of smaller mean liquid droplet diameters.

The injector 100 is operated so that at least a portion of atomizing gas is injected into each zone 110, 120. In a preferred embodiment, the flow of atomizing gas into the first mixing zone 110 is at least 10 wt %, more preferably between about 10 and about 50 wt. %, based on the total weight of the atomizing gas injected into the feed. The remainder of the atomizing gas passes to the second mixing zone 120, and subsequent mixing zones, if included.

The FCC Process

In a preferred embodiment, the processes and apparatuses disclosed herein are used in FCC operation. The FCC operation may be carried out in any type of fluid catalytic cracking unit/process without limitations as to the special arrangement of the reaction, stripping, and regeneration zones, etc. FCC feed passes to a FCC unit where it is injected through one or more feed injectors/nozzles into the reaction zone, usually comprising a riser reactor, and contacts a hot regenerated catalytic cracking catalyst passed from a regeneration zone. The hot catalyst vaporizes and cracks the FCC feed to form cracked products and coke. The cracking reaction deposits coke on the catalyst, thereby at least partially deactivating the catalyst (referred to as spent catalyst). The cracked products are preferably rapidly separated from spent catalyst using a cyclone separator.

The spent catalyst passes into a stripping zone where a stripping agent, such as steam, strips volatiles (strippable hydrocarbons) from the spent catalyst. Stripping may be performed under low severity conditions to retain adsorbed hydrocarbons on the spent catalyst for heat balance.

The stripped catalyst passes to the regeneration zone where it is regenerated by burning off the coke on the catalyst in the presence of an oxygen-containing gas, preferably air. Regeneration restores catalyst activity and simultaneously heats the catalyst to between 650° C. and 800° C. The hot catalyst is then recycled to the FCC reaction zone where it contacts injected FCC feed.

Any conventional FCC feed can be used. Such feeds typically include hydrocarbonaceous oils boiling in the range of about 430° F. to about 1050° F. (220–565° C.), such as gas oil, heavy hydrocarbon oils comprising materials boiling above 1050° F. (565° C.); heavy and reduced petroleum crude oil, petroleum atmospheric distillation bottoms, petroleum vacuum distillation bottoms, pitch, asphalt, bitumen, other heavy hydrocarbon residues; tar sand oils, shale oil, liquid products derived from coal liquefaction processes, and mixtures thereof. The FCC feed may also comprise recycled hydrocarbons, such as light or heavy cycle oils. Preferred feeds employed in this process are vacuum gas oils boiling in the range above about 650° F. (343° C.).

The process is preferably carried out in a conventional FCC riser reactor (reaction zone). The process conditions in the FCC reaction zone include: (i) temperatures from about 500° C. to about 650° C., preferably from about 525° C. to 600° C.; (ii) hydrocarbon partial pressures from about 10 to 40 psia (70–280 kPa), preferably from about 20 to 35 psia (140–245 kPa); and, (iii) a catalyst to feed (wt/wt) ratio from about 1:1 to 12:1, preferably from about 4:1 to 10:1, where the catalyst weight is the total weight of the catalyst composite. Though not required, steam may be concurrently introduced with the feed into the reaction zone and may comprise up to about 10 wt. %, preferably between about 1 and about 3 wt. % of the feed. Preferably, the FCC feed residence time in the reaction zone is less than about 10 seconds, more preferably from about 1 to 10 seconds.

EXAMPLES

Examples 1–2

Experimental testing shows that staged steam injection can result in improved FCC yields.

Example 1

Example 1 in Table 1 shows base case yields in 50 kB/d FCC unit with 1.08 wt % incoming steam into the injector based upon the total weight of the incoming oil feed. The example can be better understood viewing FIG. 2, which illustrates an embodiment used in example 1. Steam injection into the oil feed was staged with 10 wt % of the total incoming steam injected through mixing tee 320 into first mixing zone 110 and 90 wt % of the total incoming steam injected through external sparger 310 into the second mixing zone 120. External sparger 310 was located about 13 internal pipe diameters upstream from the nozzle 200 atomizing (outlet) orifice. The second mixing zone 120 was positioned approximately 20 internal pipe diameters downstream from the first mixing zone 110. The results are shown in Column 2 of Table 1.

Example 2

The test conducted in Example 1 was conducted again, but steam injection through mixing tee 320 into first mixing zone 110 was increased to 20 wt. % of the total incoming steam and 80 wt % incoming steam into the second mixing zone 120 via external sparger 310. The results are shown in Column 3 of Table 1.

Side-by-side comparison of the results shows an increase in 430° F. conversion at constant coke yields, increased LPG yield, and increased bottoms conversion. Although the delta yields were small, the incremental steam to the first mixing zone was also small. It is believed that further increases in steam to the first mixing zone should result in greater yield improvements.

TABLE 1

| Example | 1 | 2 |
|---|---|---|
| Steam Injection Locations | Staged Injection | Staged Injection |
| Wt % Steam to Upstream Mixing Zone | 10 | 20 |
| Wt % Steam to Downstream Mixing Zone | 90 | 80 |
| Yield (wt %) | | |
| $C_2-$ | 2.8 | 2.9 |
| LPG | 17.2 | 17.5 |
| $C_5$/430° F. | 50.7 | 50.9 |
| 430° F./650° F. | 18.2 | 18.7 |
| 650° F.+ | 5.6 | 5.5 |
| Coke | 4.4 | 4.4 |
| 430° F.– Conversion wt % | 75.7 | 76.3 |

What is claimed is:

1. A FCC feed injector comprising:
   (a) a feed inlet;
   (b) a first atomizing fluid inlet;
   (c) a second atomizing fluid inlet;
   (d) an external sparger in fluid communication with the feed inlet and the first atomizing fluid inlet, the external sparger configured to define a first mixing zone;
   (e) a second mixing zone in fluid communication with the second atomizing fluid inlet and the first mixing zone, the second mixing zone configured to receive the FCC feed/atomizing fluid mixture from the first mixing zone and promote mixing between the mixture from the first mixing zone and a second atomizing fluid; and,
   (f) a feed nozzle in fluid communication with the second mixing zone, the nozzle configured to pass the FCC feed/atomizing fluid into the riser reaction zone in a predetermined spray pattern.

2. The injector according to claim 1 wherein the second mixing zone comprises an internal sparger, an external sparger, or a mixing tee.

3. The injector according to claim 1 wherein the first and second mixing zones at least partially overlap.

4. The injector according to claim 1 wherein the second mixing zone is positioned downstream from the first mixing zone.

5. The injector according to claim 1 wherein feed nozzle is positioned less than about 15 internal pipe diameters downstream from the second mixing zone.

6. The injector according to claim 1 wherein the second mixing zone is positioned less than about 50 internal pipe diameters downstream from the first mixing zone.

7. The injector according to claim 2 wherein the first and second mixing zones at least partially overlap.

8. The injector according to claim 2 wherein the second mixing zone is positioned downstream from the first mixing zone.

9. A FCC feed injector comprising:
   (a) a feed inlet;
   (b) a first atomizing fluid inlet;
   (c) a second atomizing fluid inlet;
   (d) a mixing tee in fluid communication with the feed inlet and the first atomizing fluid inlet, the mixing tee configured to define a first mixing zone;
   (e) a second mixing zone comprising an external sparger, said second mixing zone in fluid communication with the second atomizing fluid inlet and the first mixing zone, the second mixing zone configured to receive the FCC feed/atomizing fluid mixture from the first mixing zone and promote mixing between the mixture from the first mixing zone and a second atomizing fluid; and, (f) a feed nozzle in fluid communication with the second mixing zone, the nozzle configured to pass the FCC feed/atomizing fluid into the riser reaction zone in a predetermined spray pattern.

10. The injector according to claim 9 wherein the first and second mixing zones at least partially overlap.

11. The injector according to claim 9 wherein the second mixing zone is positioned downstream from the first mixing zone.

12. The injector according to claim 9 wherein feed nozzle is positioned less than about 15 internal pipe diameters downstream from the second mixing zone.

13. The injector according to claim 9 wherein the second mixing zone is positioned less than about 50 internal pipe diameters downstream from the first mixing zone.

14. injector according to claim 9 wherein the first and second mixing zones at least partially overlap.

15. The injector according to claim 9 wherein the second mixing zone is positioned downstream from the first mixing zone.

* * * * *